March 12, 1968  R. G. SWEET ET AL  3,373,437
FLUID DROPLET RECORDER WITH A PLURALITY OF JETS
Filed Aug. 1, 1967  4 Sheets-Sheet 1

INVENTORS.
RICHARD G. SWEET
RAYMOND C. CUMMING
BY
ATTORNEY.

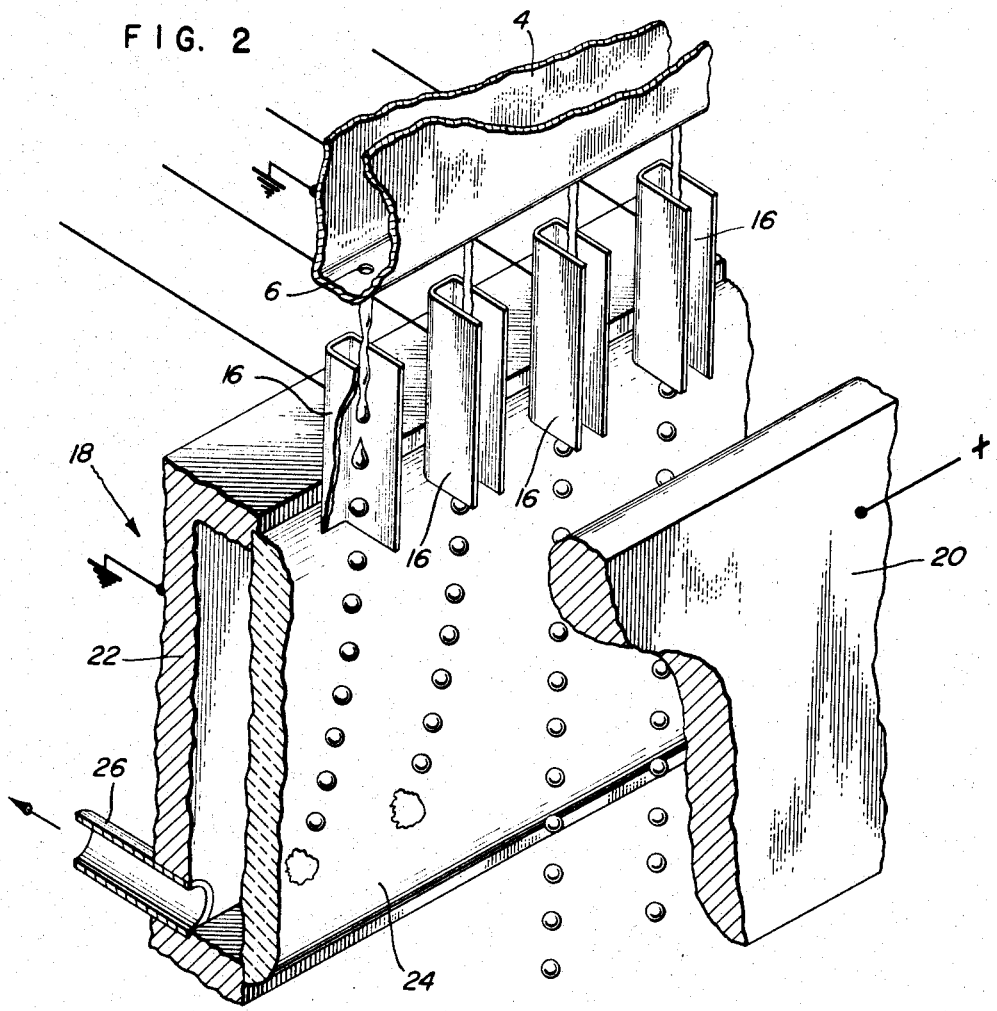

March 12, 1968   R. G. SWEET ET AL   3,373,437
FLUID DROPLET RECORDER WITH A PLURALITY OF JETS
Filed Aug. 1, 1967   4 Sheets-Sheet 4

INVENTORS.
RICHARD G. SWEET
RAYMOND C. CUMMING
BY
ATTORNEY.

United States Patent Office 3,373,437
Patented Mar. 12, 1968

3,373,437
FLUID DROPLET RECORDER WITH A PLURALITY OF JETS
Richard G. Sweet, 4076 Orme Ave., and Raymond C. Cumming, 4129 Donald Drive, both of Palo Alto, Calif. 94306
Continuation-in-part of application Ser. No. 354,721, Mar. 25, 1964. This application Aug. 1, 1967, Ser. No. 660,163
16 Claims. (Cl. 346—75)

ABSTRACT OF THE DISCLOSURE

Signal controlled recording apparatus having an array of jet nozzles each producing a succession of discrete droplets of writing fluid. The droplets are electrostatically and selectively deflected in response to signal values to effect either droplet deposition on a record medium or droplet interception. The controlling signals may be programmed in accordance with a character matrix in synchronism with the rate of droplet formation.

Cross-references to related applications

This application is a continuation-in-part of our copending application S.N. 354,721, filed Mar. 25, 1964. The disclosed invention is an improvement over the recording system disclosed and claimed in the copending application of Richard G. Sweet, S.N. 354,659, filed Mar. 25, 1964, which in turn is a continuation-in-part of application S.N. 298,996, filed July 31, 1963 (now abandoned).

Background of the invention and objects

In the aforesaid copending application S.N. 354,659, in the name of Richard G. Sweet, there is disclosed a recording apparatus and method of the type in which discrete droplets of a fluid (e.g., ink) are formed and projected toward a record medium and electrostatically deflected in accordance with signal values to produce a desired graphic record. A particular feature is that the droplets are charged in accordance with instantaneous signal values and thereafter deflected by passing them through a substantially constant electrostatic field. The embodiments disclosed in said application S.N. 354,659 employ a single jet nozzle with relative movement between the nozzle and the record medium. The droplets issuing from the nozzle may produce a line trace such as is suitable for oscillograph and other types of graphic recording. Various characters and images can be produced by scanning techniques using such a single jet nozzle.

In general, it is an object of the present invention to provide a recording system utilizing the principles of said application S.N. 354,659, and which is particularly adapted for presenting a display image as distinguished from a line trace.

Another object of the invention is to provide an apparatus and method of the above character which provides display type images with direct ink recording, and which is capable of recording facsimile signals.

Another object is to provide an apparatus and method of the above character which is capable of real-time recording of standard television signals.

Another object is to provide an apparatus and method of the above character which can be used for the recording of individual characters or signals sequentially.

Another object is to provide an apparatus and method which facilitates high speed graphic recording of characters and images.

Additional objects and features of the invention will appear from the following description in which the preferred embodiments have been set forth in detail in conjunction with the accompanying drawing.

Summary of the invention

The present apparatus and method makes use of the invention disclosed in said copending application S.N. 354,659, particularly in that fluid droplets from a jet nozzle are electrostatically deflected in accordance with signal values by electrostatically charging the droplets in accordance with instantaneous signal values and then causing the charged droplets to be deflected by passing them through a substantially constant electrostatic field, the droplets being either deposited on a record medium or deflected to droplet intercepting means. The improvement herein described consists of an array of side-by-side jet nozzles. A common fluid system supplies writing fluid under pressure to all of the nozzles, and means is provided for applying mechanical vibrations to the fluid in the system whereby varicosities are synchronously introduced into all of the streams issuing from the nozzles to produce uniform discrete droplets. Charging electrodes are provided to effect charging of the droplets of a corresponding stream in accordance with an instantaneous signal. The signal values can be programmed or controlled in various ways to produce various recordings, including characters and other images. For example the intelligence signals applied to the charging of the droplets may be derived from the scanning of a piece of copy material, as in accordance with facsimile principles; they may be derived from the scanning of material in accordance with television principles; or they may be derived from the output of a computer logic system.

Brief description of the drawing

FIGURE 2 is an enlarged fragmentary portion of the apparatus shown in FIGURE 1 and partly broken away to illustrate the operating principle of the inventive concept;

Description of the preferred embodiments

Figure 1:
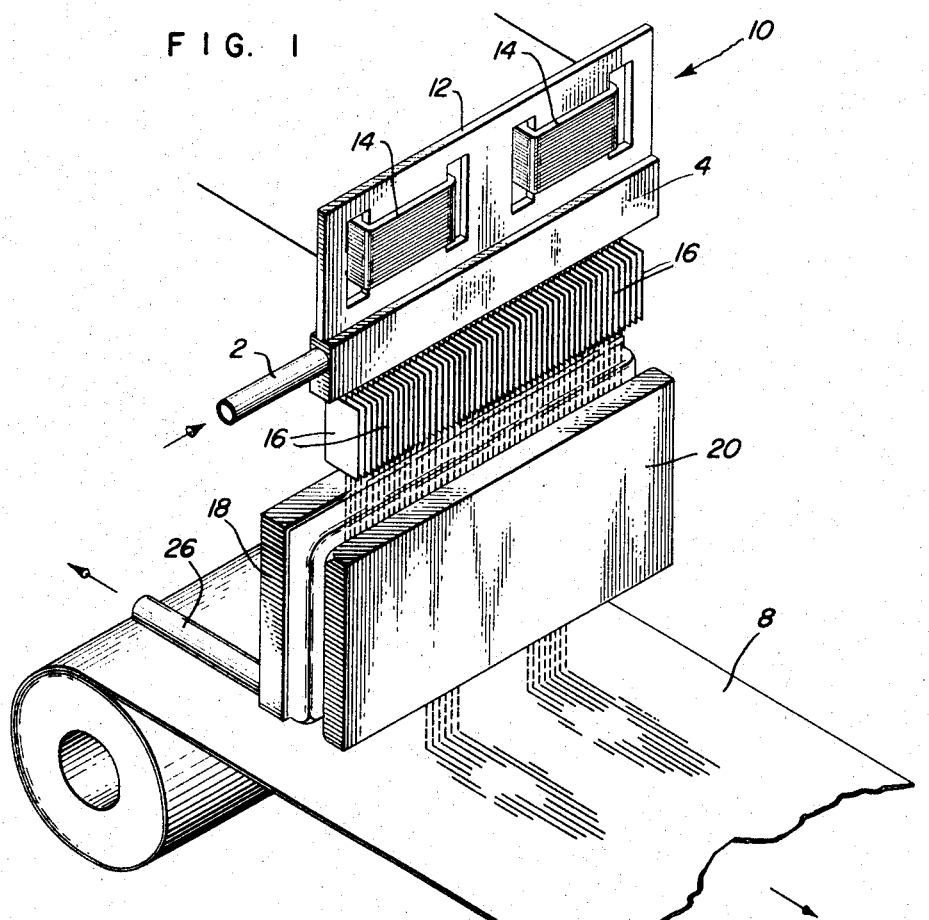
FIGURE 1 is a perspective view of apparatus constructed in accordance with and illustrating the present invention.

Referring now to the drawing in more detail, there is shown in FIGURES 1 and 2, apparatus suitable for the recording of facsimile or video images. Ink or other suitable writing fluid is supplied through a feed pipe 2 to a manifold 4. The manifold 4 receives the writing fluid from the feed pipe 2 under a substantial pressure head. A plurality of orifices 6 are provided on one side of the manifold 4. These orifices 6 are laterally spaced along the length of the manifold 4 and constitute a plurality of jet nozzles for the issuance of the writing fluid from the manifold 4, under the influence of the pressure head, toward the surface of a record receiving member 8. While it is presently contemplated that the preferred form of the invention would include a linear and uniform spacing of the orifices along the length of the manifold 4, it will be appreciated that such uniform spatial relationship between the orifices is not essential.

As in the aforementioned copending application of Richard G. Sweet, means are provided for introducing regularly spaced varicosities in the stream of writing fluid issuing from each of the nozzles. One way in which this may be accomplished is by vibrating the entire manifold 4. To this end, a magnetostrictive driver 10 is secured in driving relation to the side of the manifold 4 opposite from the orifices or nozzles 6. The magnetostrictive driver 10 includes a magnetostrictive core 12 and the associated driving coils 14. As disclosed in the aforementioned copending Richard G. Sweet application, when the writing fluid issues from the jet nozzles at high velocity under the influence of the pressure head, there is a tendency for the continuous stream of writing fluid to break-up into a succession of discrete droplets. This is due at least in part to the surface tension of the writing fluid. In order to assure that the droplets in each stream are uniform in dimension and uniformly spaced, the regularly spaced varicosities are introduced into the issuing stream as by the vibration of the manifold 4 at or near the natural droplet formation frequency. Alternatively to vibrating the entire manifold 4, that wall of the manifold which engages the magnetostrictive driver may be made flexible. With the manifold fixed in position and the one flexible wall which engages the magnetostrictive driver 10, a high frequency pressure variation is superimposed upon the substantially constant high pressure head with which the writing fluid is supplied to the manifold. Such variations in pressure head produce the desired varicosities in the issuing stream.

A plurality of droplet charging electrodes 16 are provided, corresponding in number to the individual jets or issuing streams of writing fluid. The charging electrode 16 associated with each of the issuing streams of writing fluid embraces that stream along an area that includes the point at which the individual droplets separate from the continuous stream. The signals to be recorded are applied between the manifold 4 as one electrode, assuming, of course, that the writing fluid is electrically conductive, and selected ones of the charging electrodes 16 in accordance with a selecting program as will be discussed more in detail hereafter. As the droplets in each issuing stream separate from the continuous stream, the individual droplets will be inductively charged or not charged in accordance with the potential difference existing between the common electrode or manifold and the individual charging electrode at the instant of drop separation.

In their course between the jet nozzles and the record receiving member 8, the charged droplets are caused to pass between a pair of deflecting electrodes 18 and 20. A constant electric field is established between the deflecting electrode 18 and the deflecting electrode 20. As illustrated, the deflecting electrode 18 is preferably connected to ground potential while the deflecting electrode 20 is connected to a relatively high positive potential. Thus, if the droplets to be deflected bear a positive charge they will be deflected toward the deflecting electrode 18.

The spatial relationship of the elements is such that the relatively uncharged particles are directed in a path which passes in close proximity to the surface of the grounded deflecting electrode 18. Under these conditions, a slight deflection of the droplets under the influence of the electric field established between the deflecting electrodes and acting on the charge on the droplets, causes the deflected droplets to impinge upon the surface of the grounded deflecting electrode 18. The grounded electrode 18 is especially constructed in such a manner that it not only serves as one of the deflecting electrodes, but it also serves as the intercepting means for intercepting those droplets of writing fluid which are deflected in accordance with the intelligence signals. Thus, the electrode 18 includes, first, a hollow shell member which is formed of any suitable electrode metal such as brass or the like. Second, there is provided a cover or face member 24 for the electrode 18 which is formed of a suitable porous material. This porous material may be either a ceramic-like material which may be rendered conductive as by wetting with the writing fluid; or it may be formed of a porous sintered powdered metal construction which is inherently conductive. Third, there is provided an exhaust line 26 connected to suitable exhaust pump means whereby the chamber defined between the hollow shell portion 22 of the electrode 18 and the porous cover portion 24 is maintained under at least a partial vacuum. Under the influence of this partial vacuum, the ink droplets which are intercepted by the electrode 18 are drawn through the porous cover member 24, collected in the inner chamber formed thereby, and drawn off through the exhaust line 26. Since the electrode 18 also serves as the intercepting means which is connected, through the conductive writing fluid, to other elements of the system, it is readily apparent why it is preferable that this electrode be connected to electrical ground.

Figure 3:
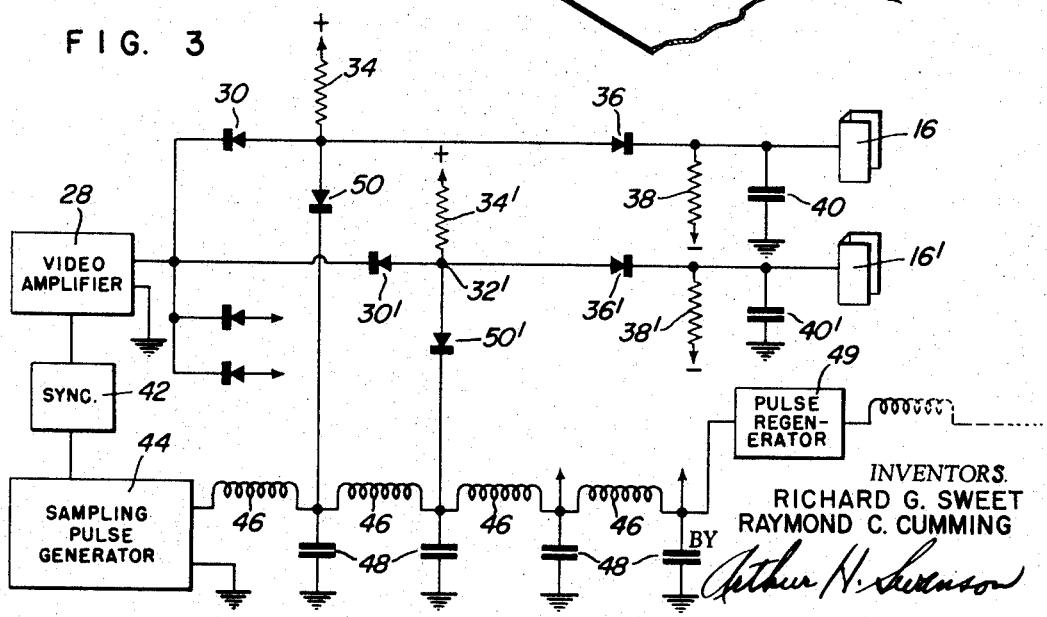
FIGURE 3 is a schematic block diagram of a portion of the electrical circuitry useful in effecting the recording in accordance with the persent invention.

As previously mentioned, one of the uses for a recording system as just described is for the recording of video or facsimile signals. So far as the signals to be recorded are concerned, the system for these uses may be substantially identical. FIGURE 3 is illustrative of circuit means which may be employed to effect the selective charging of the droplets of writing fluid whereby the record may be produced. In both fascimile and video systems, the intelligence signal is transmitted as a continuous train of signals which is modulated in accordance with the illumination of elemental image areas. In systems compatible with commercial television, the image intelligence is transmitted as a succession of image fields, each field being a succession of scanned lines of information, and each line being a succession of scanned elemental areas. In commercial television, each field is composed of 262 lines of information and each line consists of a large number of area elements. A reasonable image definition may be obtained for the purposes of the present invention, if these lines are considered as having 315 area elements. With the television fields recurring at the rate of 60 per second, the line frequency is 15,750 per second. It has been noted that each line of intelligence may be represented by 315 elemental areas or image segments. Accordingly, if the manifold 4 for the writing fluid, in accordance with the present invention, is provided with 315 laterally spaced orifices or jets and each jet is provided with a corresponding charging electrode for the ink droplets emerging from each of said jets, and the charging electrodes are sequentially energized at the proper freqeuncy, then each scan through the 315 jets represents one line of the video intelligence. Successive scanning of the jets at the line scan frequency of 15,750 per second will reproduce a reconstruction of the image from which the video intelligence signals were derived.

The circuit illustrated in FIGURE 3 is representative of means for accomplishing the desired scanning of the charging electrodes 16. Each individual charging electrode 16 is provided with a separate control circuit. These control circuits, however, are all connected simultaneously to a common source of input video intelligence signal represented in FIGURE 3 by the video amplifier 28. The output signal from the video amplifier 28 is connected to the cathode of a first blocking diode 30 included in the control or sampling circuit for the first charging electrode 16. The anode of the blocking diode 30 is connected to a junction 32. Also connected to the junction 32, through a resistor 34, is a source of positive bias potential. The junction 32 is also connected through a control diode 36 and a resistor 38 to a negative source of bias potential. The junction between the control diode 36 and the resistor 38 is connected to the first charging electrode 16. A capacitor 40 is connected between the charging electrode and ground. A similar control or sampling circuit is connected between the video amplifier and the second of the charging electrodes 16′, the comparable elements of the second circuit bearing corresponding referenced numerals but with a prime superscript. Similar control or sampling circuits are provided for each of the successive charging electrodes.

The video amplifier 28 is also connected through a suitable synchronization circuit 42 to a sampling pulse-generator 44. The sampling pulse generator 44 produces a series of pulses synchronized with the line scanning rate of the video signal. The scanning pulses thus produced are applied as input signals to a progressive delay line represented by the series connected coils 46 and the shunt connected capacitors 48. To be in harmony with the commercial video signal of our illustrative example, the total delay of the delay line is 63.5 microseconds, and the delay for each successive section is 0.2 microsecond. It is, of course, anticipated that with such a delay line, the sampling pulses would be progressively attenuated. To overcome the adverse effect of such attenuation, a pulse regenerator 49 is inserted at spaced intervals along the delay line to reconstitute the pulses. Alternatively, the scanning pulses may be applied to the control circuits, successively, from a high speed shift register (not shown).

The delayed sampling pulse produced at the end of the first section of the time delay line is applied through a gating diode 50 to the junction 32 in the first control or sampling circuit. The delayed pulse appearing after the second section of the delay line is applied through a similar gating diode 50' to the junction 32' of the second control or sampling circuit. The bias signals applied to the junction 32 of the first control or sampling circuit, and the corresponding junction of the subsequent sampling circuit is such that signals from the video amplifier are blocked, and no signal is applied to the charging electrode 16. When a sampling pulse from the delay line is applied to the gating diode 50, the bias condition at the junction 32 is changed to permit a sample pulse, representative of the instantaneous value of the video signal, to be applied to the charging electrode 16. As the sampling pulses appearing at successive sections along the delay line are applied to successive junctions 32 of the several control or sampling circuits, these circuits are gated to pass pulse signals representative of the instantaneous value of the video signal. Thus, as each sampling pulse, initiated at the beginning of a line scan, passes down the delay line, the control or sampling circuits are consecutively turned "on." The "on" time of each of the sampling circuits is approximately 0.2 microsecond for each scan line. The time interval between "on" time periods for each sampling circuit is approximately 63.5 mircoseconds, the time length of one line scan.

In order to provide variable shades of density of the reproduced image, that is shades of gray so-called, it is desirable that a plurality of droplets of writing fluid be available for each sample pulse presented to the individual charging electrodes. For example if the parameters of the system are such that the drop rate frequency, that is the frequency of the formation of the individual droplets in each jet is 63,000 per second, four droplets will be projected from each nozzle during each scan line interval. Proper control of these droplets will provide four so-called shades of gray for each sampled signal. As previously mentioned, each signal sample developed at the junction 32 of the control circuit has a time duration of 0.2 microsecond. In order for control to be exercised over all four of the individual droplets issuing during each line scan cycle, each of the control or sampling circuits includes a pulse stretcher. The capacitor 40 in each of the control or sampling circuits constitutes the storage element of such a pulse stretcher. The R-C time constant of the circuit, aided by the diode 36, is such as to stretch the pulse to embrace the entire line scan interval. This relationship is illustrated in FIGURE 4.

Figure 4:
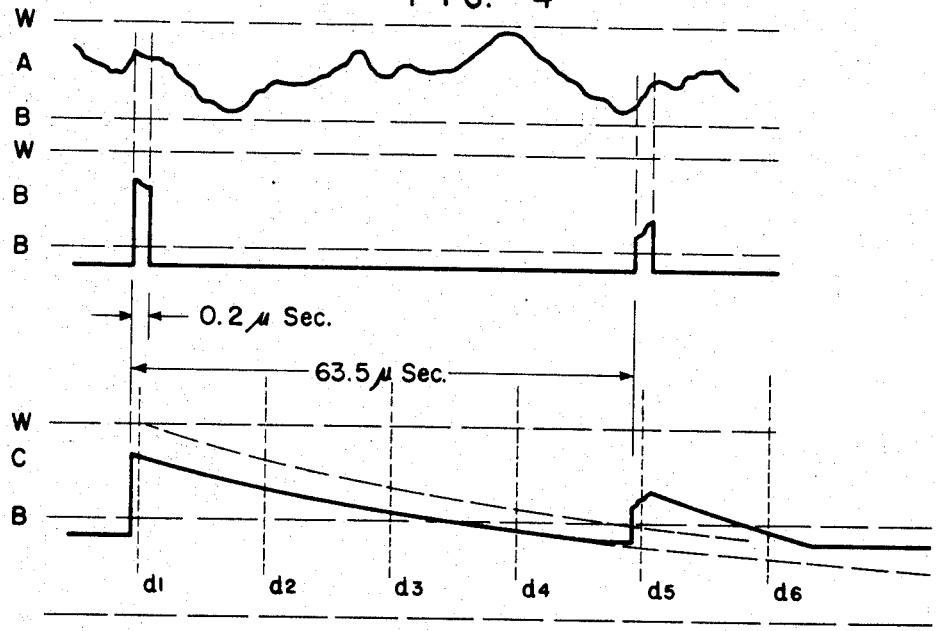
FIGURE 4 is a series of curves illustrating the relationship of signals at various points in the circuitry illustrated in FIGURE 3.

In FIGURE 4, curve A represents the intelligence portion of a typical video signal where the amplitude of the wave is representative of the brightness of the elemental area of the image. The dash line W represents that value of the video intelligence signal which would appear as white on the reproduced image, while the dash line B represents the value of the video intelligence which would appear as black on the reproduced image. Curve B represents two sample pulses each of 0.2 microsecond duration as sampled or gated by one of the control or sampling circuits. Again, it will be noted that dash lines W and B represent those values of the sampled pulses which would represent, respectively, white and black values on the reproduced image. Curve C represents the sampled pulses as applied to the charging electrodes after having been subjected to the pulse stretching influence of the sampling circuit.

It will be noted that the normal bias applied to the charging electrodes, in the absence of an applied intelligence signal, is such as to fall below the "black" reference line, that is all of the droplets of writing fluid would pass between the deflecting electrodes and impinge upon the record or paper 8. The height of the initial step in the signal applied to the charging electrode is a function of the instantaneous magnitude of the sampled pulse as shown in Curve B of FIGURE 4. This step input or intelligence signal raises the charging potential applied to the charging electrode 16 above the "black" reference line B of Curve C. This line B represents that value of the potential applied to the charging electrodes above which the droplets of writing fluid influenced thereby will be deflected and intercepted by the deflecting electrodes 18 and 20, and below which the droplets would not be deflected but be allowed to impinge upon the paper. From the peak value applied at the step input, representing the amplitude of the sampled pulse, the potential, as applied to the charging electrode, decays at a rate determined by the R-C time constant of the pulse stretcher toward the bias level below the reference line B. The solid line trace of Curve C is thus representative of the charging potential applied to one of the charging electrodes as a result of the sampled pulses illustrated in Curve B. The first sampled pulse of Curve B extends approximately three-quarters of the way between the lines B and W. The corresponding solid line curve of Curve C begins at about three-quarters of the way between the lines B and W of Curve C and decays toward and beyond the line B at the predetermined decay rate. The vertical dotted lines $D_1$, $D_2$, $D_3$, $D_4$, $D_5$, and $D_6$ of Curve C represent the recurrence of the individual ink droplets in accordance with our illustrative example. Thus four ink droplets are produced during the interval of each scan line. The droplets that occur during the interval while the solid line curve of Curve C is above the reference line B are all charged with a sufficient charge to cause them to be deflected and intercepted by the deflecting electrodes 18 and 20. The droplets that occur during the interval while the solid line curve of Curve C is above the reference line B are all charged with a sufficient charge to cause them to be deflected and intercepted by the deflecting electrodes 18 and 20. The droplets that occur during the inerval after the solid line curve has crossed below the reference line B remain substantially unchanged and pass between the deflecting electrodes and impinge upon the paper.

Referring again to our specific illustration, the sample pulse was ¾ of the way between the black and white reference lines. The applied charge to the charging electrode is such that the decay characteristic causes the first three of the droplets during that scan interval to be sufficiently charged to be deflected and intercepted. The remaining droplet occurring during that scan interval is not so charged and produces a corresponding mark on the paper. The second sample pulse is of a magnitude which reaches less than half way between the black and white reference line as indicated in Curve B. Referring to the corresponding portion of Curve C it will be seen that only the first droplet is sufficiently charged as to be deflected and intercepted by the deflecting electrodes 18 and 20. The remaining droplets are relatively uncharged and do reach the paper to produce a predominantly dark area on the record member. We have already mentioned that in the absence of an intelligence signal or if the intelligence signal is zero at the moment of sampling all of the droplets would be passed by the deflecting electrodes and impinge upon the record member. The dotted line curve superimposed upon the first portion of Curve C is representative of the action that would occur if the first sample pulse had been of sufficient magnitude to reach the white reference line of Curve B. It may be seen that the dotted line curve of Curve C decays at the same rate as the solid line curve. However, since it starts its decay from a higher level, the decaying signal does not reach the black index line until after all four droplets of that scanning interval have already been charged with a sufficient potential to cause them to be deflected and intercepted. Thus, if the sample pulse is of sufficient magnitude to reach the white reference line as shown in Curve B, then the resultant image area appearing on the record member will be a correspondingly white area. Thus, each elemental area on the resultant image may be produced by the application of between 1 and 4 droplets of writing fluid, or, in the case of white, no droplets at all.

With a repetition of this application of charges in succession to the plurality of jet streams of the writing fluid, and the record member 8 being advanced at an appropriate corresponding velocity, the resultant will be a reproduction of the image from which the video or fascimile signals were derived.

When the recording system of the present invention is used for the reproduction and display of individual characters, as for example, in the case of signals derived from the output of a computer logic system, a somewhat different form of structure may be employed. Such a structure is illustrated schematically in FIGURES 5 and 6 of the drawing. This structure is similar in some respects to that illustrated in more detail in the aforementioned copending application of Richard G. Sweet. However, in the instant case the writing fluid issues simultaneously from a plurality of jets and the intelligence signals applied to the several streams of droplets cause the selected droplets in each stream to be deflected and intercepted such that the selected droplets do not reach the record member, the deflection of the droplets being solely for the purpose of selectively intercepting a portion of the droplets in accordance with the program or intelligence signal.

Figure 5:
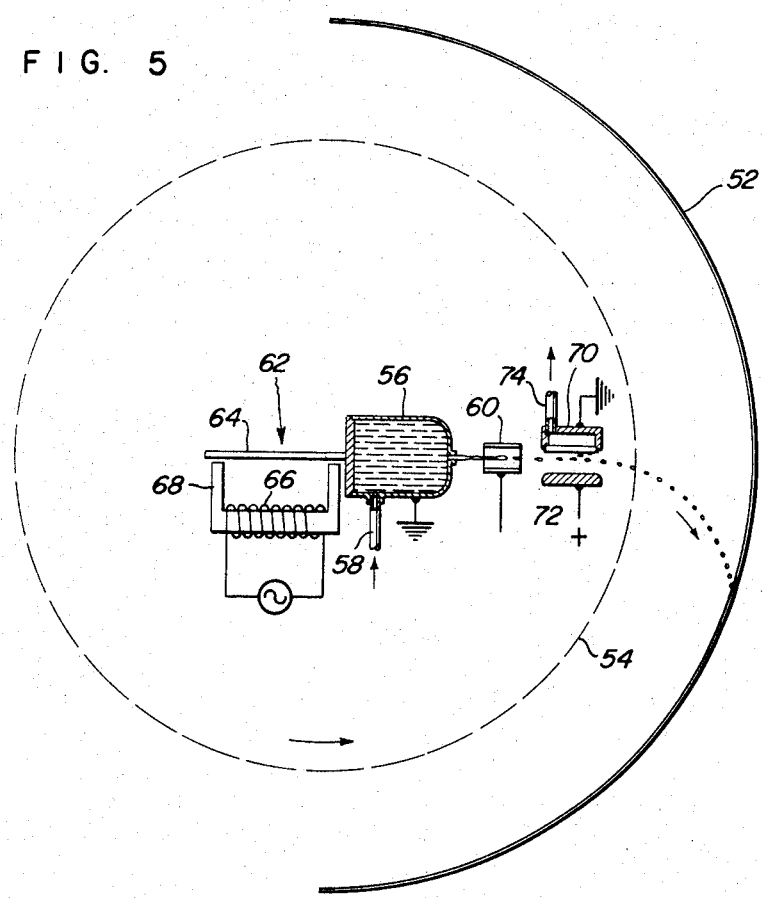
FIGURE 5 is a fragmentary sectional view illustrating another form of structure also embodying the present invention.

In the structure as shown in FIGURE 5 of the instant case, a relativly wide record member 52 is formed into a substantially semi-cylindrical, transverse configuration with the axis of the cylindrical form lying substantially parallel to the direction of advancement of the record member. This feature is consistent with and may be accomplished by means such as that illustrated in FIGURES 7 and 8 of the aforementioned copending application of Richard G. Sweet. Again, as disclosed in the referenced Sweet application, the jet forming and charging members are rotatably mounted for rotation about the axis of the cylinder defined by the record member 52. The rotating base structure which supports the droplet formation and charging means is represented in FIGURE 5 by the dashed line circle 54. In a manner similar to that illustrated in FIGURES 1 and 2, the writing fluid is supplied to a manifold 56 under a substantial pressure head through a feed pipe 58. The manifold is provided with a plurality of orifices which constitute jet nozzles for the projection of the jets of writing fluid. For the purpose of displaying and printing characters, it is considered that eight such jets are sufficient and convenient.

In the apparatus illustrated in FIGURES 1 and 2, the jets are arranged to follow parallel paths. For the purpose of character display such as that illustrated in FIGURES 5 and 6, it may be found convenient to arrange the jets in a converging array. Such an arrangement permits greater spacing between the individual orfices and the accompanying charging electrodes while providing a relatively small area of impingements of droplet on the record member. For example, if the eight jets represent the height of the printed character, such printed character may be on the order of a tenth of an inch in height on the record member.

As before, each of the several jets is provided with a droplet charging electrode 60. The selection and charging of these electrodes may be controlled as discussed in more detail hereinafter. Here again it is desirable to produce the regularly spaced varicosities in the issuing stream of the writing fluid 8 in order to assure a measure of uniformity in drop rate formation as well as in the drop dimension. To this end, a vibratory means 62 is coupled to the manifold 56. This vibratory means is illustrated as including a magnetostrictive driving member 64, an excitation winding 66, and a field core 68. Means providing an oscillatory driving signal is connected to the field coil 68 to cause the magnetostrictive driving member 64 to vibrate at a desired frequency, for example, at 100 kc.

As the issuing droplets are formed by the jets, they are charged in accordance with the programmed material by the charging electrodes 60. In the operation of the system as here contemplated, the charges are applied simultaneously to the selected charging electrodes and, hence, to the selected droplets. The charged droplets of writing fluid are then projected between a pair of deflecting electrodes 70 and 72. These deflecting electrodes are arranged to cause the droplets to be deflected or not deflected in accordance with the charges on the individual droplets. The deflecting electrodes may be similar in construction to those illustrated in FIGURES 1 and 2. Thus, the electrode 70 may provide the dual function as serving as one of the electrodes of the deflecting electrode pair as well as that of serving as the means of intercepting the selected, deflected droplets. Thus, as the formed and charged droplets pass between the deflecting electrodes 70 and 72, those droplets having the selected charged condition thereon are deflected sufficiently out of their normal path as to impinge upon the surface of the intercepting electrode 70, which is provided with a permeable or porous surface. The intercepted ink droplets are drawn through the porous surface, into the chamber defined within the structure of the electrode 70 and carried back to a suitable reservoir by means of the exhaust line 74. As the rotating assembly 54 turns about its axis, each stream of projected droplets scans a transverse line across the width of the record member. With the issuance of the droplets being projected toward the record member under the control of the intelligence signal, each transverse scan across the width of the record member produces a line of data symbols or character representations. Coincident with the rotation of the rotating assembly, hence of the transverse scanning of the record member, the record member is advanced longitudinally of the axis of rotation in such a manner that successive rotations of the writing assembly produces successive scan lines on the record member. It will be appreciated that more than one writing assembly might be included on the rotating structure and, by proper commutation by well-known means, provide for alternate scan lines being recorded by alternate writing assemblies. Such an arrangement would effectively double the overall writing speed of the instrumentality.

Figure 7:
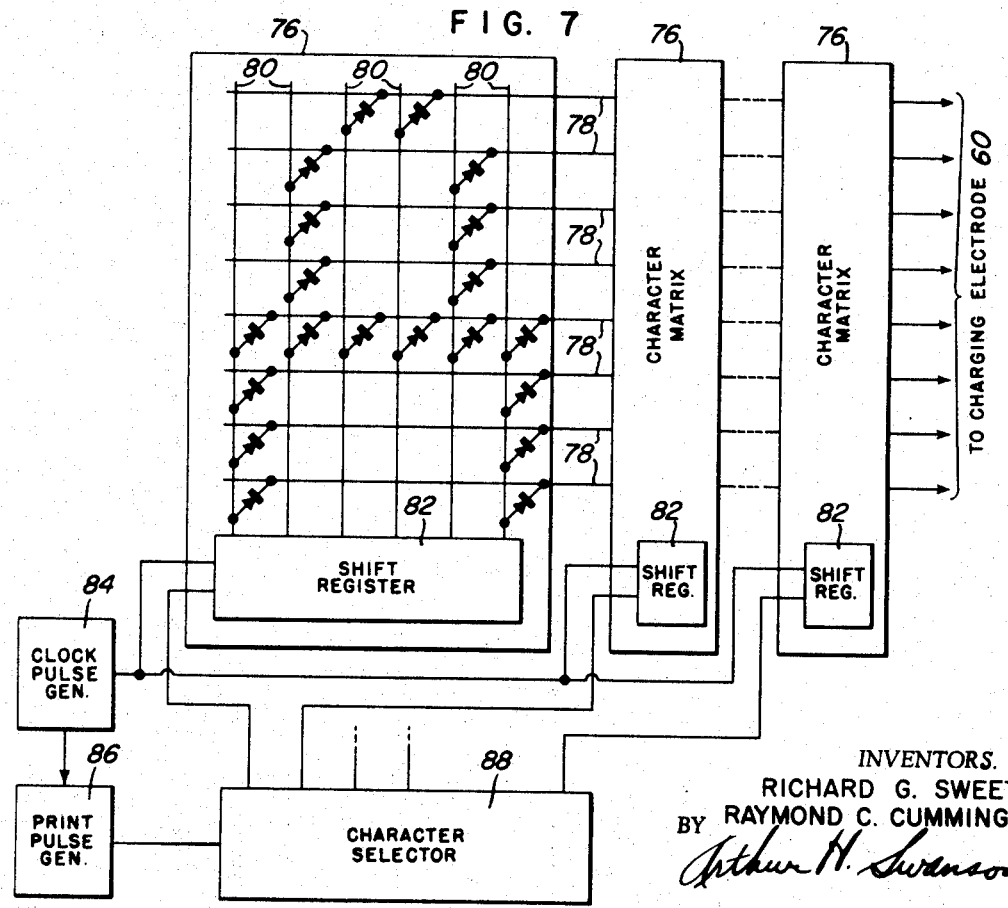
FIGURE 7 is a block diagram of electrical circuitry usable with the apparatus shown in FIGURES 5 and 6.
Figure 6:
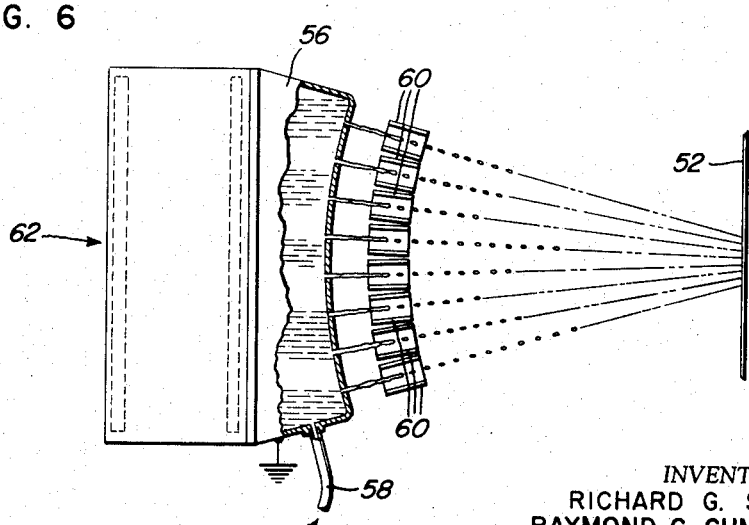
FIGURE 6 is an enlarged cross-sectional view of a portion of the apparatus shown in FIGURE 5.

In FIGURE 7 there is shown, illustratively, one system for controlling the energization of the charging electrodes as in FIGURES 5 and 6. Each symbol or character to be recorded is represented by a character matrix 76 such as is illustrated in FIGURE 7. Each character matrix 76 is formed of eight horizontal or transmitting lines 78 and six vertical or control lines 80. Each of the transmitting lines are connected to one of the charging electrodes of the writing assembly. It will be appreciated that a constant-amplitude pulse generator may be interposed in each of the transmitting lines 78 to be triggered by the signals on those lines, to supply uniform pulses to the charging electrodes. Each of the matrices is individually controlled by a shift register 82 which energizes the vertical or control lines in a timed sequence. The shift register of the matrices are controlled by pulses from a clock-pulse generator 84 which is operated synchronously with the droplet formation. A print-pulse generator 86 is synchronized with the clock-pulse generator 84 and produces a series of print pulses, at a frequency equalling the rate at which characters are to be reproduced, which are applied, through a character selector 88, to trigger the shift registers 82 into operation to effect the energization of matrices 76. It is contemplated that the character selector 88 may include any suitable means for selecting in synchronism with the print pulses, the individual character to be presented to the charging electrodes, one said character being presented at a time. Thus, the character selector 88 may include any of the numerous automatic computers which may be programmed to select individual characters in accordance with the computer logic system.

It will be evident from the foregoing that we have provided an apparatus and method which is an improvement to the invention of Sweet application S.N. 354,659. Particularly, the present invention provides a direct-writing recording system for presenting a display-type image, which image may be the result of the intelligence signals derived from and in accordance with facsimile or television principles, or from the output of a computer logic system. Also it facilitates high speed operations for recording characters and images.

We claim:

1. A direct writing recorder responsive to various signal values comprising, in combination, means for forming a plurality of discontinuous streams of writing fluid, each stream being in the form of a succession of discrete droplets, said plurality of streams being arranged in a laterally displaced array; said means including a manifold, a plurality of laterally displaced orifices communicating with said manifold and constituting a plurality of jet nozzles for the writing fluid, a feed pipe connected to said manifold for supplying writing fluid to said manifold under a substantial pressure head whereby to cause said writing fluid to be projected from said plurality of jet nozzles toward the surface of a record receiving member for deposit thereon, means for introducing regularly spaced varicosities in the streams of said writing fluid issuing from said nozzles to assure the formation of droplets of uniform frequency and dimension; droplet intercepting means, and means for electrostatically and selectively charging and deflecting the droplets to effect either droplet deposition on the record medium or droplet interception by said intercepting means in response to various signal values.

2. A recorder as in claim 1 in which the means for introducing regularly spaced varicosities consists of means for applying mechanical vibration to the fluid in the manifold.

3. A recorder as in claim 2 in which the means for applying mechanical vibration superposes vibrating variations in the pressure head of the fluid within the manifold.

4. A recorder as in claim 2 in which the means for applying mechanical vibration consists of means for vibrating one wall of the manifold.

5. A recorder as in claim 1 in which the jet nozzles are disposed in a uniformly spaced lateral array.

6. A recorder as in claim 1 in which the jet nozzles are uniformly and laterally spaced and parallely oriented to form an array and in which their intercepting means extends parallel to the array but spaced therefrom.

7. A recorder as in claim 1 in which the jet nozzles are so disposed that the undeflected flight pattern of the droplets toward the record medium is convergent.

8. A recorder as in claim 1 in which the electrostatic charging means includes an electrostatic electrode associated with each stream, and program control means for applying signal values to selected ones of the electrodes.

9. A recorder as in claim 1 further characterized by the provision of means for causing said array to be cyclically scanned transversely of the record receiving member.

10. A recorder as in claim 8 in which the program control means applies signal values to selected ones of the electrodes in accordance with a character matrix.

11. A recorder as in claim 10 including means for applying signal values to selected ones of the electrodes timed to be in synchronism with the rate of droplet formation.

12. Recorder apparatus of the type in which fluid droplets from a jet nozzle are electrostatically deflected in accordance with signal values by electrostatically charging the droplets in accordance with instantaneous signal values and then causing the charged droplets to be deflected by passing them through a substantially constant electrostatic field, the droplets being either deposited on a record medium or deflected to droplet intercepting means; the improvement comprising an array of side by side jet nozzles, a common fluid manifold adapted to receive fluid under pressure and in communication with all of said nozzles, means for applying mechanical vibration to the fluid to introduce varicosities synchronously into all of the streams issuing from the nozzles to produce uniform discrete droplets, the droplets of the streams having the same uniform spacing and being projected in synchronism, and charging electrodes each disposed to effect charging of the droplets of a corresponding stream in accordance with an instantaneous signal.

13. A recorder as in claim 12 together with means serving to mechanically scan the array of jet nozzles laterally of the record medium.

14. A recorder as in claim 12 together with means for causing the instantaneous signal values to be programmed in accordance with a character matrix and in synchronism with the rate of droplet formation.

15. A recorder as in claim 12 in which each of said jet nozzles corresponds to an elemental area on said record medium and in which an image having black and various shades of gray is formed, a predetermined plurality of deposited droplets producing black and lesser numbers of deposited droplets producing shades of gray, said recorder including means coupled to said charging electrodes to effect the deposition of all said predetermined plurality of droplets or interception of predetermined fractions of said predetermined plurality of droplets whereby a shaded image is formed.

16. A recorder as in claim 15 in which said last mentioned means includes a time delay circuit for determining said predetermined fractions.

References Cited

"Fast Oscillograph Squirts Ink," Electronic Design, Oct. 11, 1963, pp. 28–29.

RICHARD B. WILKINSON, *Primary Examiner.*

JOSEPH W. HARTARY, *Assistant Examiner.*